UNITED STATES PATENT OFFICE 2,386,142

QUATERNARY AMMONIUM SALTS AND PROCESS OF MAKING THE SAME

Maurice Arthur Thorold Rogers, Blackley, Manchester, England, assignor to Imperial Chemical Industries Limited, a corporation of Great Britain No Drawing. Original application August 2, 1939, Serial No. 288,059. Divided and this application April 23, 1940, Serial No. 331,189. In Great Britain August 2, 1938

7 Claims. (Cl. 260—295)

This application is a division of my copending application Serial No. 288,059, filed August 2, 1939.

The present invention relates to the manufacture of new quaternary ammonium compounds which are useful in treating textile materials, especially for the purpose of conferring water-repellent properties thereon.

According to the invention we make new quaternary ammonium salts by causing a halogenomethyl compound of the formula

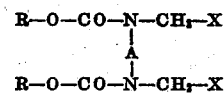

wherein R is an aliphatic radical of at least 7 carbon atoms, X is a halogen and A is a divalent organic radical, to react with an aliphatic or heterocyclic tertiary amine.

As will be seen from the formula, the halogenomethyl compounds which are used as starting materials are derivatives of the fatty alcohols ROH. They are, in fact, conveniently made by interaction of two molecular proportions of the chloroformic ester of the alcohol ROH with one molecular proportion of a diamine NH$_2$—A—NH$_2$, whereby a dicarbamate of formula

is obtained, followed by treatment of the said dicarbamate with formaldehyde (or a polymer thereof) and a hydrogen halide or a substance behaving as such under the conditions of the reaction (e. g. phosgene), or with a product of the interaction of formaldehyde and a hydrogen halide, namely a dihalogenodimethyl ether.

Then as suitable fatty alcohols for making the halogenomethyl compounds there may be mentioned, for example, octyl, decl, dodecyl, myristyl, cetyl, octadecenyl, octadecyl and ceryl alcohols and mixtures of these and similar alcohols obtained by reduction of the acids of natural fats and oils e. g. coconut oil, palm kernel oil or wool fat, alcohols obtainable by reduction of the esters of montanic acid, alcohols obtainable by hydrolysis of the mixed sulphuric esters which are formed by sulphonation of polymerised lower olefines and also alcohols which are likewise esters such, for example, as β-hydroxyethyl stearate.

Thus as suitable halogenomethyl compounds to be used in the process of the invention there may be mentioned, for example, di-octadecyl N:N'-di- (chloromethyl) -ethylenedicarbamate, di-octadecyl N:N' - di - (chloromethyl) - hexamethylenedicarbamate, di - octadecyl N:N' - di- (chloromethyl) - p - phenylenedicarbamate, di-octadecyl N:N'-di-(chloromethyl) - m - phenylenedicarbomate, di-octadecyl N:N'-di - (chloromethyl)-o-phenylenedicarbamate, di-octadecyl N:N'-di-(chloromethyl) - 1:5 - naphthylenedicarbamate, di-octadecyl N:N'-di-(chloromethyl) - 2 - methoxy-1:4 - phenylenedicarbamate, di-octadecyl N:N' - di-(chloromethyl)-2-chloro-1:4-phenylenedicarbamate, di - octadecyl N:N' - di- (chloromethyl) -6 - methyl-1:3-phenylenedicarbamate, the di-(chloromethyl) - dicarbamates having the formulae respectively.

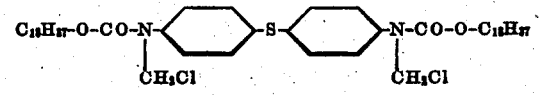

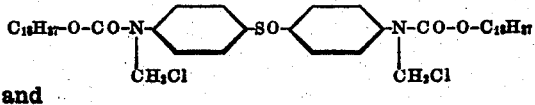

and

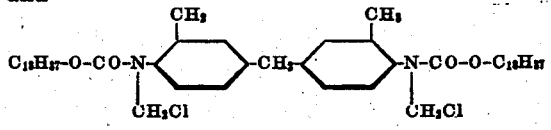

and also the corresponding di-(bromomethyl)-dicarbamates and the corresponding di-dodecyl, di-cetyl, and di-montanyl di-(chloromethyl)- and di-(bromomethyl)-dicarbamates. All the above di-(halogenomethyl)-dicarbamates and their analogues may be made by the general method already described.

A suitable aliphatic or heterocyclic tertiary amines to be combined with the di-(halogenomethyl)-dicarbamates there may be mentioned, for example, trimethylamine, triethylamine, N:N'-tetramethylethylenediamine, dimethylcyclohexylamine, diethylcyclohexylamine, N-methylpiperidine pyridine and α-picoline.

In carrying the invention into practical effect the halogenomethyl compound and the tertiary amine are mixed, optionally in presence of a solvent or diluent. The reaction is exothermic and it is desirable in some cases to moderate its violence by using a large bulk of solvent or diluent or by applying external cooling means.

The new quaternary salts are white or pale coloured solids which are soluble in water, benzene, alcohol, chloroform and ethylene dichloride and sparingly soluble in ether and acetone. Their aqueous solutions are viscous and foam slightly on shaking but when they are boiled the foaming power is gradually lost and the quaternary salt is decomposed. When the quaternary salts themselves are heated above 100° C. they decompose, forming water-insoluble waxy substances.

A special characteristic of our novel series of compounds is their adaptability of being applied to textile materials, which are of animal or vegetable origin or which are composed of regenerated cellulose or of cellulose esters or ethers, to give them properties of softness, or of softness and water-repellence, which are resistant to laundering or dry-cleaning treatments. This effect can be brought about by impregnating the said textile materials with a solution or suspension of one or more of the said quaternary salts in water or a suitable organic liquid, and subsequently submitting the impregnated material to a short heat treatment at a temperature such that the quaternary salt undergoes decomposition, as more fully described in my parent application above referred to.

The invention is illustrated but not limited by the following examples in which the parts are by weight.

*Example 1*

The starting out material for this example is made as follows:

35 parts (i. e. $\frac{1}{20}$ mol) of di-octadecyl p-phenylene-dicarbamate of the formula $C_{18}H_{37}$—O—CO—NH—$C_6H_4$(p)—
                                NH.CO—O—$C_{18}H_{37}$ (M. P. 146° C. made by condensing two molecular proportions of octadecyl chloroformate with one molecular proportion of p-phenylenediamine) and 6 parts of paraformaldehyde (i. e. $\frac{1}{10}$ mol) are mixed with 500 parts of benzene. The mixture is stirred and heated. The temperature is kept at 60° C. while dry hydrogen chloride is passed in. As the reaction proceeds water separates out and the liquid becomes turbid. Eventually the liquid becomes clear again and the water separates from it and forms a separate layer. The lower aqueous layer is then run to waste. The benzene is distilled off from the upper layer, preferably under sub-atmospheric pressure. The residue left in the still is di - octadecyl N : N'-di-(chloromethyl)-p-phenylenedicarbamate of the formula:

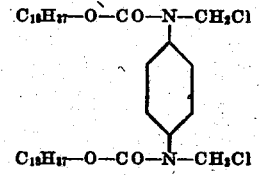

It is an oil, which on standing at room temperature, or on cooling to below room temperature, solidifies to a white waxy solid which fumes slightly in the air, and which is soluble in the cold in benzene, acetone, ether, ethyl acetate and chloroform.

This dichloromethyl compound, in liquid form, is mixed with 10 parts (i. e. $\frac{1}{8}$ mol) of pyridine; there is evolution of heat, and the mixture rapidly sets solid. The solid is di-octadecyl N:N' - di-(chloropyridinium-methyl)-p-phenylenedicarbamate of the formula:

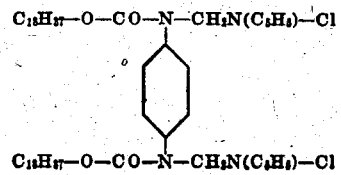

The product may be purified if necessary by dissolving it in cold chloroform, filtering the solution if necessary, and adding dry acetone, which brings about a precipitation. The white solid so obtained is filtered off and washed with dry acetone. It dissolves in water on warming forming clear viscous solutions which foam slightly on shaking. It is also soluble in benzene, chloroform and methyl and ethyl alcohols.

In a similar manner, starting in each case with 1 molecular proportion of the corresponding dicarbamic acid dialkyl ester, 2 molecular proportions of formaldehyde and 2.5 molecular proportions of pyridine, there may be made the following dipyridinium dichlorides, namely, di-octadecyl N:N' - di - (chloropyridinium-methyl)-m-phenylenedicarbamate, di-octadecyl N:N'-di-(chloropyridinium - methyl)-o-phenylenedicarbamate, di - octadecyl N:N'-di-(chloropyridinium - methyl) - 6-methyl-1:3-phenylenedicarbamate, di-octadecyl N:N'-di-(chloropyridinium-methyl) - 2 - chloro-1:4-phenylenedicarbamate, di-dodecyl N:N'-di-(chloropyridinium-methyl)-p-phenylenedicarbamate, di-octadecyl N:N'-di-(chloropyridinium - methyl) - ethylenedicarbamate, di - octadecyl N:N'-di-(chloropyridinium-methyl)-hexamethylenedicarbamate, and di - octadecyl N:N' - di - (chloropyridinium-methyl)-methylenedicarbamate.

*Example 2*

35 parts of di-octadecyl m-phenylenedicarbamate (M. P. 96° C., made by condensing two molecular proportions of octadecyl chloroformate with one molecular proportion of m-phenylenediamine) are converted into the dichloromethyl compound by the method described, in respect of the p-isomer, in Example 1.

The di-octadecyl N:N'-di-(chloromethyl)-m-phenylenedicarbamate so obtained is dissolved in 150 parts of benzene. The solution is cooled to below 10° C. and stirred and 20 parts of triethylamine are gradually added during 1 hour. The cooling and stirring are continued for a further 16 hours. 600 parts of acetone are then added whereby the quaternary salt is precipitated. It is filtered off and dried.

Di-octadecyl N:N'- di -(triethylchloroammoniummethyl)-m-phenylenedicarbamate is thus obtained in the form of a white powder. It dissolves in water, forming clear viscous solutions which foam slightly on shaking. It is also soluble in benzene, ethanol and chloroform; it is insoluble in ether.

If in this process there are used, instead of the 35 parts of di-octadecyl m-phenylenedicarbamate, 33 parts of di-octadecyl ethylenedicarbamate, there is similarly obtained di-octadecyl N:N' - di - (triethylchloroammoniummethyl) - ethylenedicarbamate. This compound likewise is obtained as a white powder which dissolves in water, forming clear viscous solutions which foam slightly on shaking, and which is soluble also in benzene, chloroform and ethanol.

If in either of the above processes, instead of adding to the solution of the dichloromethyl compound 20 parts of triethylamine, 12 parts of trimethylamine are passed in and the product is then worked up as described, there is obtained di-octadecyl N:N'- di -(trimethylchloroammonium-methyl)-m-phenylenedicarbamate or di-octadecyl N:N'-di-(trimethylchloroammonium-methyl) - ethylenedicarbamate. These compounds have properties similar to those of their triethylammonium analogues.

Example 3

Di-octadecyl N:N'-di-(chloromethyl)-p-phenylenedicarbamate (made as described in Example 1 from 35 parts of di-octadecyl p-phenylenedicarbamate) is dissolved in 100 parts of benzene. The solution is cooled to below 10° C. and stirred and 25 parts of dimethylcyclohexylamine are gradually added during 1½ hours. The stirring and cooling are continued for a further 16 hours. 150 parts of ethyl acetate are then added whereupon di-octadecyl N:N'-di-(cyclohexyl-dimethyl-chloroammonium-methyl)-p-phenylenedicarbamate separates out in the form of a viscous oil. This is washed by decantation with ethyl acetate and then with dry acetone. On prolonged standing in an evacuated vessel it solidifies and is then ground to a powder. It is a pale yellow, slightly hygroscopic solid which dissolves in water, forming solutions which foam slightly. It is also soluble in benzene, chloroform and trichloroethylene.

I claim:

1. Quaternary ammonium salts, useful as water-repellent agents, of the formula

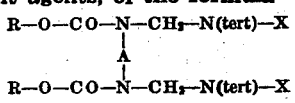

wherein R is an aliphatic radical of at least 7 carbon atoms, X is a halogen, A is a divalent organic radical selected from the group consisting of aliphatic and aromatic radicals free of substituents which are reactive toward formaldehyde, and N(tert) stands for a member of the group consisting of aliphatic and heterocyclic tertiary amines.

2. Process for the manufacture of new quaternary ammonium salts which comprises causing a halogenomethyl compound of the formula

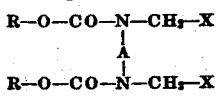

wherein R is an aliphatic radical of at least 7 carbon atoms, X is a halogen and A is a divalent organic radical selected from the group consisting of aliphatic and aromatic radicals free of substituents which are reactive toward formaldehyde, to combine with a member of the group consisting of aliphatic and heterocyclic tertiary amines.

3. Quaternary ammonium salts, useful as water-repellent agents, of the formula

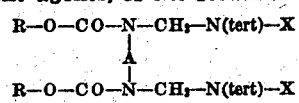

wherein R is an aliphatic radical of at least 7 carbon atoms, X is a halogen, A is an alkylene radical and N(tert) stands for a member of the group consisting of aliphatic and heterocyclic tertiary amines.

4. Process for the manufacture of new quaternary ammonium salts which comprises causing a halogenomethyl compound of the formula

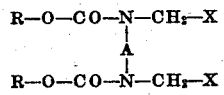

wherein R is an aliphatic radical of at least 7 carbon atoms, X is a halogen and A is an alkylene radical, to combine with a member of the group consisting of aliphatic and heterocyclic tertiary amines.

5. Quaternary ammonium salts, useful as water-repellency agents, of the formula

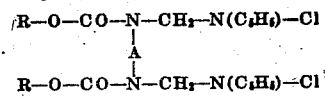

wherein R is an aliphatic radical of at least 7 carbon atoms, A is an alkylene radical and $N(C_5H_5)$ stands for the pyridine radical.

6. Process for the manufacture of quaternary ammonium salts which comprises causing a chloromethyl compound of the formula

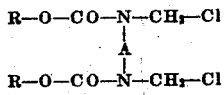

wherein R is an aliphatic radical of at least 7 carbon atoms and A is an alkylene radical, to combine with pyridine.

7. Quaternary ammonium compounds having the formula:

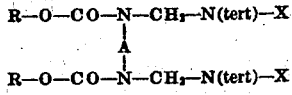

in which R is an aliphatic radical of at least 7 carbon atoms, X is a halogen, A is an alkylene radical and N(tert) is a tertiary aliphatic amine.

MAURICE ARTHUR THOROLD ROGERS.

Certificate of Correction

Patent No. 2,386,142.   October 2, 1945.

MAURICE ARTHUR THOROLD ROGERS

It is hereby certified that errors appear in the printed specification of the above numbered patent requiring correction as follows: Page 1, first column, line 39, for "decl" read *decyl*; and second column, lines 22 to 25 inclusive, for that portion of the formula reading

line 34, for "A" read *As*; and that the said Letters Patent should be read with these corrections therein that the same may conform to the record of the case in the Patent Office.

Signed and sealed this 18th day of December, A. D. 1945.

[SEAL]

LESLIE FRAZER,
*First Assistant Commissioner of Patents.*